United States Patent [19]
Beier et al.

[11] Patent Number: 5,243,880
[45] Date of Patent: Sep. 14, 1993

[54] DRIVESHAFT

[75] Inventors: Rudolf Beier, Offenbach; Peter Amborn, Neunkirchen; Wolfgang Exner, Hennef; Herbert Frielingsdorf, Lohmar; Klaus Greulich, Hollig; Joachim Altdorf, Cologne; Ivan Rericha, Sinnersdorf, all of Fed. Rep. of Germany

[73] Assignees: GKN Automotive AG, Siegburg; Lohr & Bromkamp GmbH, Offenbach am Main; Ford-Werke AG, Cologne, all of Fed. Rep. of Germany

[21] Appl. No.: 676,096

[22] Filed: Mar. 27, 1991

[30] Foreign Application Priority Data

Apr. 4, 1990 [DE] Fed. Rep. of Germany ..... 40109003

[51] Int. Cl.$^5$ ............... F16H 57/02; F16C 3/00
[52] U.S. Cl. ................... 74/607; 464/180; 464/183
[58] Field of Search .............. 464/180–183, 464/81, 112, 149, 158; 74/607, 567, 574; 301/124 R

[56] References Cited

U.S. PATENT DOCUMENTS

| | | | |
|---|---|---|---|
| 3,037,573 | 6/1962 | Larsen | 464/180 X |
| 3,155,187 | 11/1964 | De Lorean | 464/180 |
| 3,420,072 | 1/1969 | Baier et al. | 464/180 X |
| 4,518,370 | 5/1985 | Orain | 464/183 X |

FOREIGN PATENT DOCUMENTS

| | | | |
|---|---|---|---|
| 0130065 | 5/1932 | Austria | 464/183 |
| 1525212 | 9/1969 | Fed. Rep. of Germany | 464/183 |
| 1755860 | 12/1971 | Fed. Rep. of Germany | 464/180 |
| 3009277 | 12/1984 | Fed. Rep. of Germany | 74/607 |
| 0209402 | 12/1982 | Japan | 301/124 R |
| 60-168913 | 2/1985 | Japan | 74/607 |
| 2071272 | 9/1981 | United Kingdom | 464/183 |
| 2241769 | 9/1991 | United Kingdom | 301/124 R |

*Primary Examiner*—Vinh T. Luong
*Attorney, Agent, or Firm*—Harness, Dickey & Pierce

[57] ABSTRACT

A driveshaft for a motor vehicle has an approximately constant wall thickness and a changing outer diameter which extends analogously to the amplitude of the second basic vibration of the natural bending frequency. In this way it is possible to achieve a distribution of cross-sectional area which is functionally optimized and meets the respective strength requirements. At the same time, torsional stiffness values may be set as required and natural resonance frequency values may be varied. With help of this design it is possible to move the natural resonance frequency of the tubular shaft into a speed range of minimum external excitation energy.

15 Claims, 2 Drawing Sheets

DRIVESHAFT

BACKGROUND OF THE INVENTION

The invention relates to a driveshaft produced in one piece by a forming operation, especially for driving a motor vehicle, designed in the form of a symmetrical tubular shaft with a central tube region with a larger outer diameter, having end regions provided at both ends with toothed receiving regions for universal joints.

DE-PS 30 09 277 proposes a driveshaft of this type for being used as a side shaft in the motor vehicle drive. The driveshaft substantially consists of a tubular shaft comprising two ends with stepped diameters with receiving regions for the universal joints. The entire central part of the tubular shaft is designed to be cylindrical and has the maximum outer diameter. In order to achieve a uniform mechanical strength over the entire region of the tubular shaft, the wall thickness is reduced with an increasing outer diameter. The disadvantage of this design is that attention is paid to the aspect of mechanical strength only and that adjustment of the natural bending frequency to existing requirements can be achieved within a limited extent only, with the natural bending frequency as a rule being within the range of -an excitation frequency of the engine/transmission system so that an interfering vibration noise cannot be avoided.

SUMMARY OF THE INVENTION

It is therefore the object of the present invention to provide a driveshaft whose vibration behavior is improved by ensuring that the natural frequency values are set within a frequency range of minimum external excitation with the help of simple design means, thereby reducing the vibration noise.

In accordance with the invention, the objective is achieved in that the central tube region has an approximately constant wall thickness and that the outer diameter extends along the axial length analogously to the amplitude of the second or a higher basic vibration of the natural bending frequency.

By maintaining a constant wall thickness of the driveshaft while varying the outer diameter it is possible to achieve a distribution of cross-sectional area which is functionally optimized and which meats basic strength requirements, with the required torsional stiffness -being adjusted and with the natural resonance frequency for the bending and torsional vibrations of the shaft being adapted to the respective requirements. This means that while rotational stiffness and acoustic behavior are optimized, the load bearing capacity of the individual cross-sections may greatly exceed minimum requirements. By designing the tubular shaft with an amplitude of the second or a higher basic vibration of the natural bending frequency, it is possible, as a result of the increasing cross-sectional area, to achieve an increase in the deformation resistance of the tubular shaft as far as the center of the respective tube half and to improve both the vibration behavior and noise development.

A continuous change in cross-sectional area is achieved for example by providing the maximum outer diameter in the center of the tubular shaft or in the vicinity of the center of the tubular shaft and by providing the minimum outer diameter in the vicinity of the two end regions of the tubular shaft and in the vicinity of the tubular shaft center. By maintaining the tube symmetry, the central tube region, at its ends, may be continued cylindrically. By giving the tubular shaft this shape, it is possible to move the natural resonance frequency into the range of minimum external excitation, thereby avoiding any interfering vibration noise.

Between its maximum and minimum outer diameter the tubular shaft is designed to be conical and/or parabolic in the longitudinal section, thereby achieving a continuous change in cross-sectional area.

BRIEF DESCRIPTION OF THE DRAWINGS

With the help of two embodiments, the invention will be described in more detail with reference to the drawings wherein.

DETAILED DESCRIPTION OF THE PREFERRED EMBODIMENTS

Figure 1:
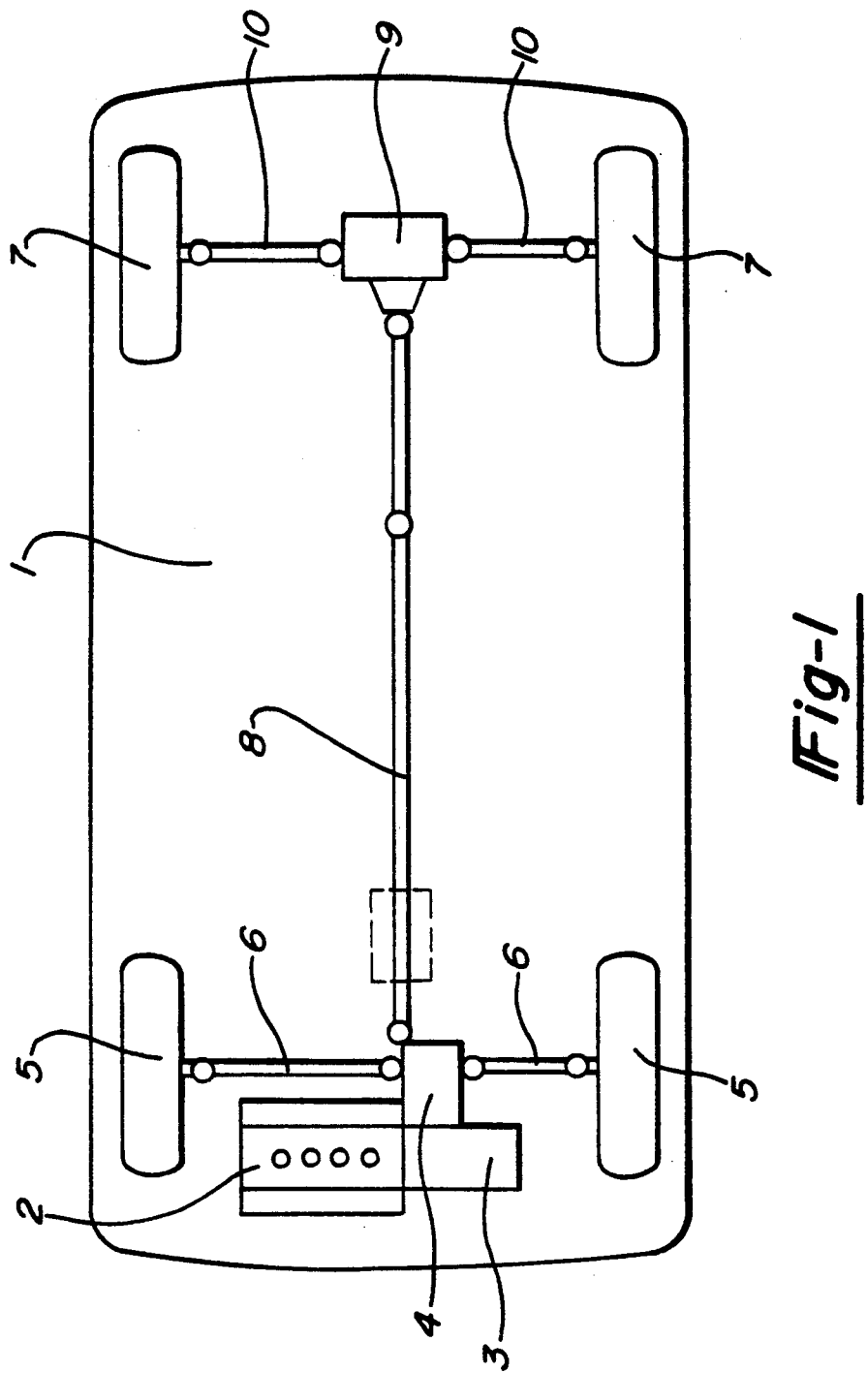
FIG. 1 shows a motor vehicle with front and rear driveshafts.

FIG. 1 shows a diagrammatic view of a motor vehicle 1 which, via a front engine 2 with a gearbox 3 and a front axle differential 4, drives the front wheels 5 via front driveshafts 6. The driving torque for the rear wheels 7 is branched off the front axle differential 4 and is transmitted via a longitudinal driveshaft 8 to a rear axle differential 9. The rear axle differential 9 drives the rear wheels 7 via rear driveshafts 10. The front and rear driveshafts 6, 10 should be designed in accordance with the invention.

Figure 2:
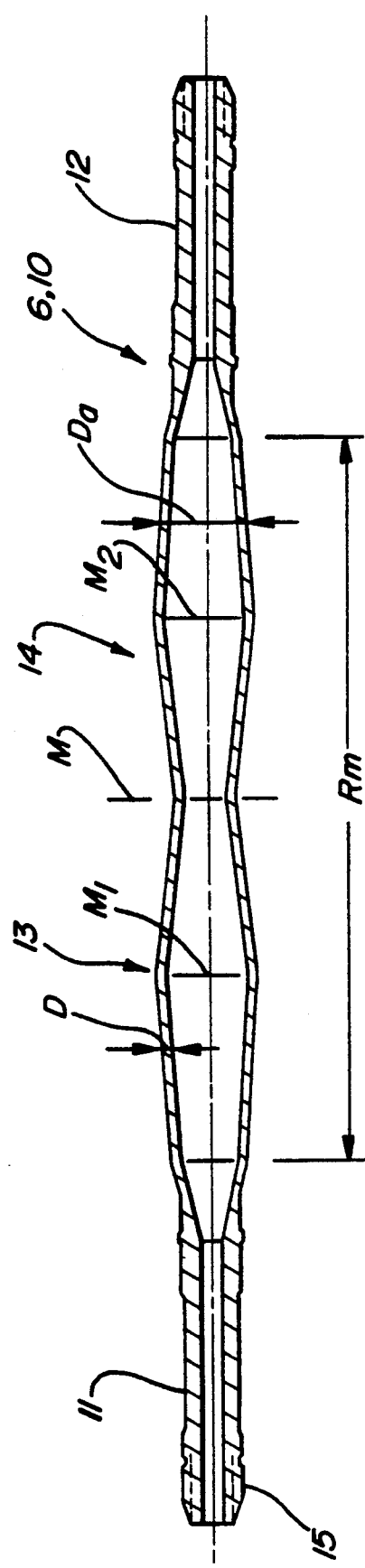
FIG. 2 is a longitudinal section through an embodiment of the tubular shaft.
Figure 3:
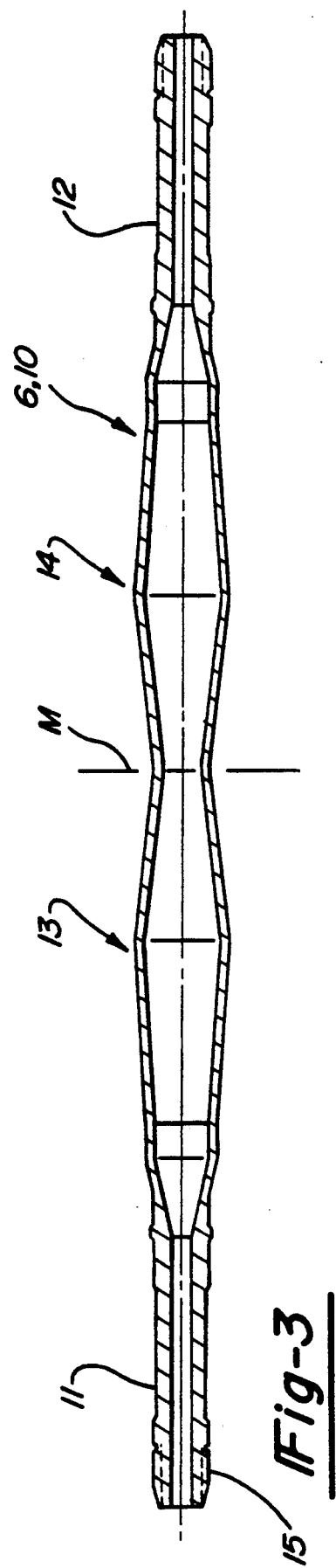
FIG. 3 shows a longitudinal section through a further embodiment of the tubular shaft.

FIGS. 2 and 3 each illustrate a driveshaft 6,10 which, with its toothed receiving region 15 at the end regions 11, 12, is accommodated in corresponding recesses of an inner joint member (not illustrated). With the embodiments illustrated, the wall thickness D remains unchanged along the entire length of the central tubular shaft. However, it is also conceivable for the wall thickness D to be different in some regions of the tubular shaft. The minimum outer diameter Da is provided in the tubular shaft center M and in the vicinity of the end regions 11, 12. In FIGS. 2 and 3, the maximum outer diameter Da is provided in the center M of each half 13, 14 of the tubular shaft and 11 M2 in FIG. 3, the central tube region Rm of the tubular shaft is additionally cylindrically extended With these driveshafts, the regions between the maximum and minimum outer diameter D a extend conically. Alternatively, it is conceivable for the regions, in the longitudinal section, to extend parabolically or partially conically and, in the longitudinal section, partially parabolically, with the axial and rotational symmetry being maintained.

We claim:

1. A one piece symmetrical tubular driveshaft for motor vehicles comprising:
    a central tube region and end regions at both ends of the central tube region, said end regions having teeth for coupling with universal joints, said central tube region having a larger outer diameter than said end regions and a substantially constant wall thickness, said central tube region divided into two halves, each half having a first and second elongated section, a tube wall of said first section being continuous with said end region and diverging away from said end regions to a predetermined outer maximum diameter and said second section beginning continuous with said first section at said maximum diameter with the tube wall of said second section converging to a predetermined minimum diameter at a center of said central tubular region with the outer diameter of the tube varying along its length.

2. A driveshaft according to claim 1, wherein the central tube region is cylindrically extended by the same amount towards both end regions.

3. A driveshaft according to claim 1, wherein the minimum outer diameter is provided in the tubular shaft center and in the vicinity of each of the two end regions of the tubular shaft.

4. A driveshaft according to claim 1, wherein the maximum outer diameter is provided in the center of each of the two halves of the tubular shaft.

5. A driveshaft according to claim 1, wherein the maximum outer diameter is provided in the vicinity of the center of each of the two halves of the tubular shaft.

6. A driveshaft according to claim 1, wherein in the regions between the minimum and maximum outer diameter the tubular shaft is designed to be conical in the longitudinal section.

7. A driveshaft according to claim 2, wherein the minimum outer diameter is provided in the tubular shaft center and in the vicinity of each of the two end regions of the tubular shaft.

8. A driveshaft according to claim 2, wherein the maximum outer diameter is provided in the center of each of the two halves of the tubular shaft.

9. A driveshaft according to claim 3, wherein the maximum outer diameter is provided in the center of each of the two halves of the tubular shaft.

10. A driveshaft according to claim 2, wherein the maximum outer diameter is provided in the vicinity of the center of each of the two halves of the tubular shaft.

11. A driveshaft according to claim 3, wherein the maximum outer diameter is provided in the vicinity of the center of each of the two halves of the tubular shaft.

12. A driveshaft according to claim 2, wherein in the regions between the minimum and maximum outer diameter the tubular shaft is designed to be conical in the longitudinal section.

13. A driveshaft according to claim 3, wherein in the regions between the minimum and maximum outer diameter the tubular shaft is designed to be conical in the longitudinal section.

14. A driveshaft according to claim 4, wherein in the regions between the minimum and maximum outer diameter the tubular shaft is designed to be conical in the longitudinal section.

15. A driveshaft according to claim 5, wherein in the regions between the minimum and maximum outer diameter the tubular shaft is designed to be conical in the longitudinal section.

* * * * *